(12) United States Patent
Jang et al.

(10) Patent No.: US 9,333,412 B2
(45) Date of Patent: May 10, 2016

(54) VIRTUAL GOLF SIMULATION APPARATUS AND METHOD AND SENSING DEVICE AND METHOD USED FOR THE SAME

(75) Inventors: Hyung Wook Jang, Daejeon (KR); Hyun Dam Jeong, Daejeon (KR); Hyun Jin Park, Daejeon (KR); Hyung Sik Yoon, Daejeon (KR)

(73) Assignee: GOLFZON CO., LTD., Daejeon (KR)

( * ) Notice: Subject to any disclaimer, the term of this patent is extended or adjusted under 35 U.S.C. 154(b) by 303 days.

(21) Appl. No.: 14/004,925

(22) PCT Filed: Mar. 22, 2012

(86) PCT No.: PCT/KR2012/002070
§ 371 (c)(1),
(2), (4) Date: Sep. 13, 2013

(87) PCT Pub. No.: WO2012/128566
PCT Pub. Date: Sep. 27, 2012

(65) Prior Publication Data
US 2014/0004968 A1   Jan. 2, 2014

(30) Foreign Application Priority Data
Mar. 22, 2011   (KR) .................. 10-2011-0025153

(51) Int. Cl.
*A63B 69/36*   (2006.01)
*A63B 71/06*   (2006.01)
*G09B 9/00*   (2006.01)
*G09B 19/00*   (2006.01)
*G06K 9/00*   (2006.01)

(52) U.S. Cl.
CPC ........ *A63B 71/0622* (2013.01); *G06K 9/00342* (2013.01); *G09B 9/00* (2013.01); *G09B 19/0038* (2013.01)

(58) Field of Classification Search
None
See application file for complete search history.

(56) References Cited

U.S. PATENT DOCUMENTS

| 5,437,457 | A | * | 8/1995 | Curchod | A63B 24/0021 434/252 |
| 5,863,255 | A | * | 1/1999 | Mack | A63B 24/0021 473/151 |
| 6,579,190 | B2 | | 6/2003 | Yamamoto | |
| 7,641,565 | B2 | | 1/2010 | Kiraly | |
| 2007/0298898 | A1 | * | 12/2007 | Kiraly | A63B 69/3658 473/131 |
| 2010/0104136 | A1 | | 4/2010 | Kiraly | |
| 2010/0130298 | A1 | * | 5/2010 | Dugan | A63B 69/3623 473/223 |
| 2010/0184496 | A1 | | 7/2010 | Nicora et al. | |

FOREIGN PATENT DOCUMENTS

KR   10-0949847 B1   3/2010
KR   10-0970675 B1   7/2010

* cited by examiner

*Primary Examiner* — Jason Yen
(74) *Attorney, Agent, or Firm* — Revolution IP, PLLC

(57) ABSTRACT

Disclosed are a virtual golf simulation apparatus and method in which a golf ball hit by a user who swings at the golf ball is sensed by a sensing device, and the trajectory of the golf ball is simulated on a virtual golf course based on the sensed result so that the user can enjoy virtual golf on the virtual golf course, thereby providing the same sense of reality that the user would feel playing a round of golf on a real golf course.

6 Claims, 4 Drawing Sheets

VIRTUAL GOLF SIMULATION APPARATUS AND METHOD AND SENSING DEVICE AND METHOD USED FOR THE SAME

CROSS REFERENCE TO PRIOR APPLICATIONS

This application is a National Stage Application of PCT International Patent Application No. PCT/KR2012/002070 filed on Mar. 22, 2012, under 35 U.S.C. §371, which claims priority to Korean Patent Application No. 10-2011-0025153 filed on Mar. 22, 2011, which are all hereby incorporated by reference in their entirety.

TECHNICAL FIELD

The present invention relates to a virtual golf simulation apparatus and method and a sensing device and method used for the same, and more particularly to a virtual golf simulation apparatus and method in which a virtual golf course is imaged and simulated, and the trajectory of a golf ball hit by a user is sensed by a sensing device and is simulated on the virtual golf course, and a sensing device and method used for the same.

BACKGROUND ART

In recent years, various devices have been developed which allow users to enjoy popular sports games, such as baseball, soccer, basketball and golf, in rooms or in specific places through simulation in the form of interactive sports games.

Particularly, in recent years, a so-called screen golf system has been developed in which, when a user swings a golf club to hit a golf ball placed on a hitting mat, a sensing device senses the hit golf ball to extract physical information on the moving golf ball so that the trajectory of the golf ball can be simulated on a virtual golf course, thereby allowing the user to enjoy golf in virtual reality.

In order to simulate sports using balls, such as golf balls, in such interactive sports games, much research has been conducted into various sensing systems for accurately sensing physical information on a moving ball, i.e. movement of a ball.

For example, various sensing devices, such as a sensing device using an infrared sensor, a sensing device using a laser sensor, a sensing device using an acoustic sensor and a sensing device using a camera sensor, have come onto the market.

The infrared sensor has an advantage in that sensing processing time is short, and therefore, simulation is rapidly carried out. However, the infrared sensor has a problem in that sensing accuracy is low. On the other hand, the camera sensor has an advantage in that sensing accuracy is improved. However, the camera sensor has a problem in that sensing processing time is long, and therefore, a simulation image of the trajectory of a golf ball is realized a predetermined time after a user hits the golf ball, whereby reality of virtual golf is greatly reduced and thus user interest is greatly lowered.

DISCLOSURE

Technical Problem

It is an object of the present invention to provide a virtual golf simulation apparatus and method and a sensing device and method used for the same in which a golf ball hit by a user who swings at the golf ball is sensed by a sensing device, and the trajectory of the golf ball is simulated on a virtual golf course based on the sensed result so that the user can enjoy virtual golf on the virtual golf course, thereby providing the same sense of reality that the user would feel playing a round of golf on a real golf course and, particularly, in which a plurality of frame images of the golf ball hit by the user is acquired, and, as soon as the images are collected, the images are processed in real time, thereby greatly reducing sensing processing time, with the result that a simulation image is realized almost simultaneously when the user swings at the golf ball, thereby further improving reality.

Technical Solution

In accordance with an aspect of the present invention, the above and other objects can be accomplished by the provision of a sensing device used in a virtual golf simulation apparatus, including at least one capturing means for acquiring a plurality of frame images of a golf ball hit by a user, an image collection means for sequentially collecting the frame images acquired by the at least one capturing means, and an image processing means for receiving and processing the frame images collected by the image collection means in real time to extract information on physical properties of the golf ball which is moving.

In accordance with another aspect of the present invention, there is provided a sensing device including a camera unit for acquiring a plurality of frame images of a golf ball hit by a user and a sensing processing unit including an image collection means for sequentially collecting the frame images acquired by the camera unit, and an image processing means for receiving and processing the frame images collected by the image collection means in real time to extract information on physical properties of the golf ball which is moving, and an image realization means for realizing a simulation image of a trajectory of the golf ball based on the information extracted by the sensing processing unit.

In accordance with another aspect of the present invention, there is provided a sensing method for virtual golf simulation, including acquiring a plurality of frame images of a golf ball hit by a user, an image collection means sequentially collecting the acquired frame images, transmitting the frame images collected by the image collection means to an image processing means in real time, and the image processing means processing the frame images received in real time to extract information on physical properties of the golf ball which is moving.

In accordance with a further aspect of the present invention, there is provided a virtual golf simulation method including sensing whether hitting preparation has been completed, sensing whether hitting has been performed when the hitting preparation has been completed, collecting and storing an image when the hitting has been performed and images before and after the hitting on a per frame basis, processing the collected images in real time to extract information on physical properties of a moving golf ball, and realizing a simulation image of a trajectory of the golf ball based on the extracted information on the physical properties of the golf ball.

Advantageous Effects

In the virtual golf simulation apparatus and method and a sensing device and method used for the same according to the present invention, it is possible to acquire a plurality of frame images of a golf ball when a user swings at the golf ball and processes the frame images in real time, thereby greatly reducing sensing processing time. Consequently, a simulation image can be realized almost simultaneously when the user swings at the golf ball, thereby further improving reality.

BEST MODE

Now, exemplary embodiments of a virtual golf simulation apparatus and method according to the present invention and a sensing device and method used for the same will be described in detail with reference to the accompanying drawings.

First, a virtual golf simulation apparatus according to an embodiment of the present invention and a sensing device used in the same will be described with reference to FIGS. 1 and 2.

Figure 1:
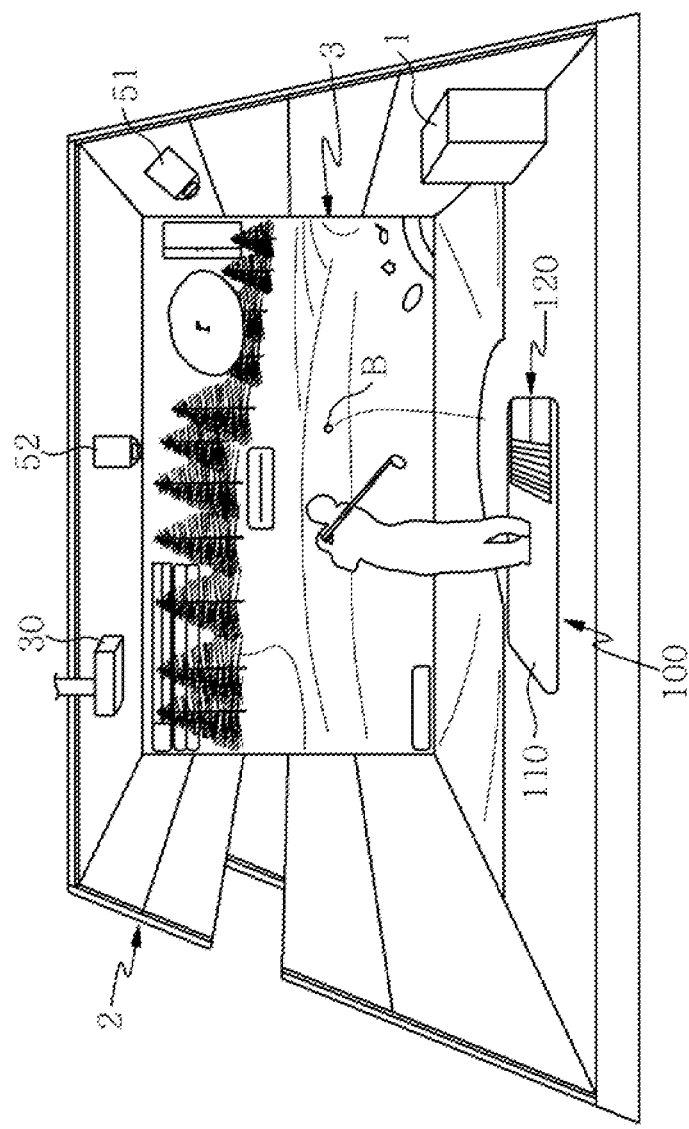
FIG. 1 is a view showing an example of a screen golf system to which a virtual golf simulation apparatus according to an embodiment of the present invention is applied.
Figure 2:
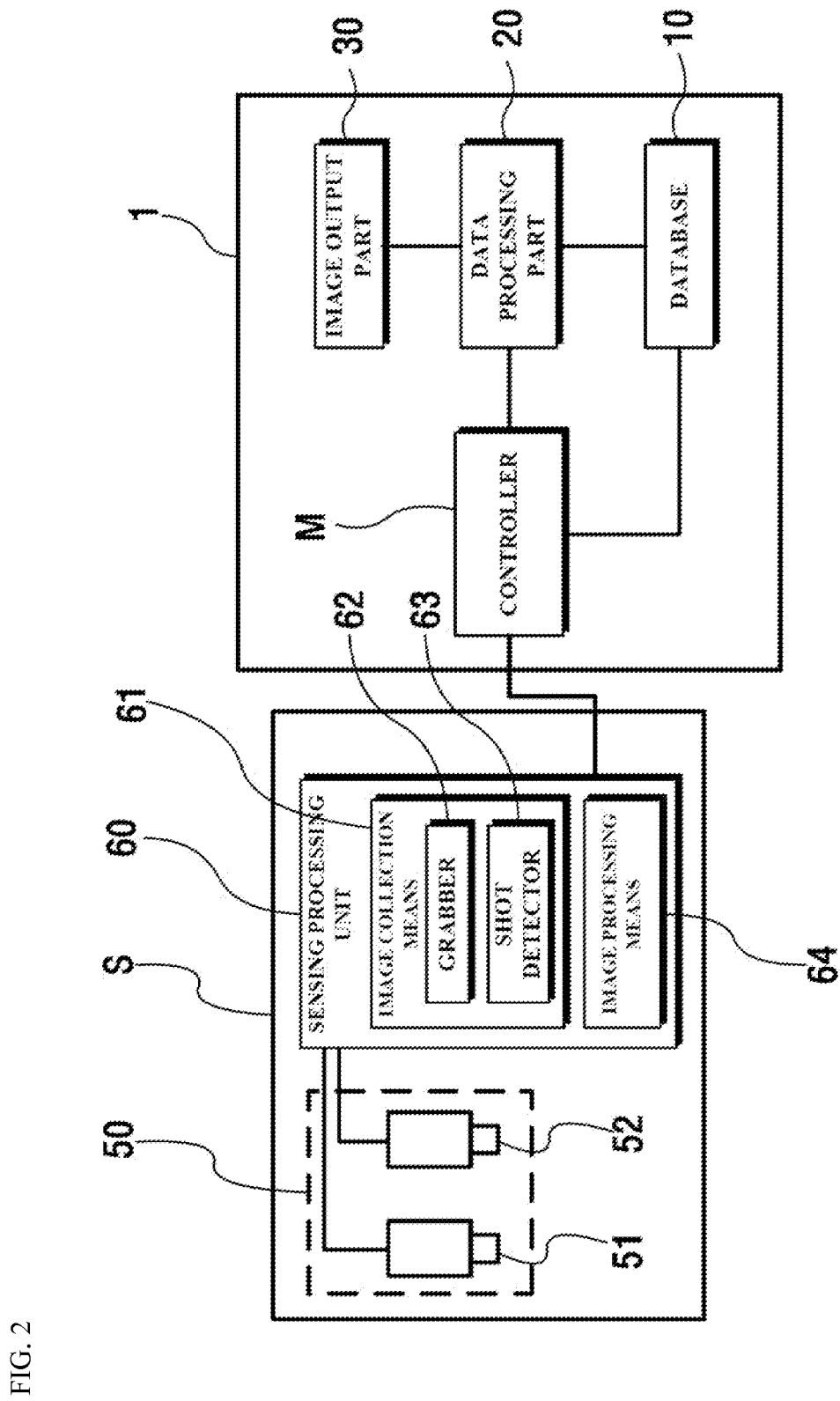
FIG. 2 is a block diagram showing the construction of a virtual golf simulation apparatus according to an embodiment of the present invention.

FIG. 1 is a view showing an example of a screen golf system to which a virtual golf simulation apparatus according to an embodiment of the present invention is applied, and FIG. 2 is a block diagram showing the construction of a virtual golf simulation apparatus applied to the screen golf system shown in FIG. 1.

As shown in FIGS. 1 and 2, the virtual golf simulation apparatus according to the embodiment of the present invention includes a sensing device S for sensing a golf ball B hit by a user and a simulator 1 for realizing an image of a virtual golf course and providing a simulation image of the trajectory of the golf ball B on the virtual golf course based on the result sensed by the sensing device S so that virtual golf simulation can be performed.

As shown in FIG. 1, the screen golf system, to which the virtual golf simulation apparatus according to the embodiment of the present invention is applied, may be configured to have a structure in which a hitting box 110, on which a user hits a golf ball B, is provided on the floor of a golf booth 2 providing a space of a predetermined size, a hitting mat 120, on which a golf ball B is placed so that the user can hit the golf ball B on the hitting box 110, is provided at one side of the hitting box 110, and a screen 3, on which an image of virtual golf simulation output from an image output device (an image output part 30 shown in FIG. 2, such as a beam projector), to which image information is transmitted from the simulator 1, is projected, is provided at the front of the golf booth 2.

The hitting box 110 and the hitting mat 120 are provided on a swing plate 100 as shown in FIG. 1. Alternatively, the hitting box 110 and the hitting mat 120 may be provided on the floor of the golf booth 2.

The swing plate 100 may be provided so that the swing plate 100 can be sloped at a predetermined angle in the frontward and rearward direction and in the left and right direction. Also, the swing plate 100 may be connected to the simulator 1 so that the swing plate 100 can be sloped in correspondence to the topography of a virtual golf course which is presently being realized.

Meanwhile, the sensing device S is provided in the golf booth 2 to sense a golf ball B hit by a user. FIG. 1 shows a case in which an image sensing type sensing device is provided as the sensing device S.

That is, as shown in FIG. 1, the virtual golf simulation apparatus according to the embodiment of the present invention may include an image sensing type sensing device S including a camera unit 50 and a sensing processing unit 60 as the sensing device S.

The camera unit 50 may be constituted by a single capturing means for image sensing or two or more capturing means. In order to acquire an image of a moving golf ball B and extract coordinates of the golf ball in a three-dimensional space, it is preferable to configure a stereo type camera unit using two or more capturing means 51 and 52 as shown in FIG. 1.

FIGS. 1 and 2 show a case in which the sensing device of the virtual golf simulation apparatus according to the present invention is an image sensing type sensing device; however, the present invention is not limited thereto. For example, any sensing device may be included so long as the sensing device can sense a golf ball hit by a user and extract physical properties of the moving golf ball through predetermined information processing. Hereinafter, an image sensing type sensing device for acquiring an image of a ball hit by a user and extracting physical properties of the moving golf ball through predetermined information processing will be described.

As shown in FIG. 2, the sensing device S may include a camera unit 50 including a plurality of capturing means 51 and 52, and a sensing processing unit 60 for processing an image acquired by the camera unit 50 to extract physical properties of the moving golf ball.

The physical properties of the moving golf ball may include velocity of the golf ball, a moving direction of the golf ball (a moving angle of the golf ball in the horizontal direction), an altitude angle of the golf ball (a moving angle of the golf ball in the vertical direction), and spin of the golf ball.

The sensing processing unit 60 may include an image collection means 61 for sequentially collecting source images acquired by the camera unit 50 on a per frame basis and an image processing means 64 for receiving and processing the frame images collected by the image collection means 61 in real time to extract information on physical properties of a moving golf ball.

Preferably, the image collection means 61 includes a grabber 62 for transmitting images acquired by the capturing means 51 and 52 to a shot detector 63 while storing the images and a shot detector 63 for processing the images received from the grabber 62 to sense whether hitting preparation has been completed and to sense whether hitting has been performed and for collecting and storing images to be transmitted to the image processing means 64 upon sensing that hitting has been performed.

The sensing device of the virtual golf simulation apparatus according to the present invention is basically characterized in that, immediately upon collecting a frame image, the image collection means 61 transmits the collected frame image to the image processing means 64 in real time so that image processing for extracting physical properties of a moving golf ball is carried out in real time, whereby image processing is rapidly performed and thus simulation is rapidly carried out without delay.

Consequently, it is preferable for sequential collection of the images by the image collection means 61 and image processing by the image processing means 64 to be independently carried out.

Transmission of an image in real time means that, after the image collection means 61 transmits a frame image to the image processing means 64 and when processing of the received frame image by the image processing means 64 has been completed, an image (which may be the next frame image or the frame image after next) collected by the image collection means 61 is transmitted to the image processing means 64 so that the image processing means 64 processes the received image. That is, image processing is carried out in real time, thereby greatly reducing time necessary to extract physical properties of a golf ball. Transmission of the image in real time will be described below in detail.

Meanwhile, the simulator 1 constituting the virtual golf simulation apparatus according to the embodiment of the present invention preferably includes a controller M, a database 10, an data processing part 20 and an image output part 30.

The database 10 stores all data necessary for virtual golf simulation. For example, the database 10 stores data necessary to drive the system, data necessary to realize an image of a virtual golf course, and data necessary to realize a simulation image of the trajectory of a golf ball.

The data processing part 20 is a part which performs predetermined image processing to realize an image of a virtual golf course or a simulation image of the trajectory of a golf ball on the virtual golf course.

The image output part 30 outputs image information received from the data processing part 20 to a screen so that a user can watch the image.

The controller M receives information based on the result sensed by the sensing device S to control operations of all components, such as the database 10, the data processing part 20 and the image output part 30, of the simulator 1. That is, the controller M, the database 10 and the data processing part 20 function as an image realization means for realizing a simulation image of the trajectory of a golf ball based on the result sensed by the sensing device S.

Hereinafter, a sensing device and method used for the virtual golf simulation apparatus according to the embodiment of the present invention will be described in more detail with reference to FIGS. 3 and 4.

Figure 3:
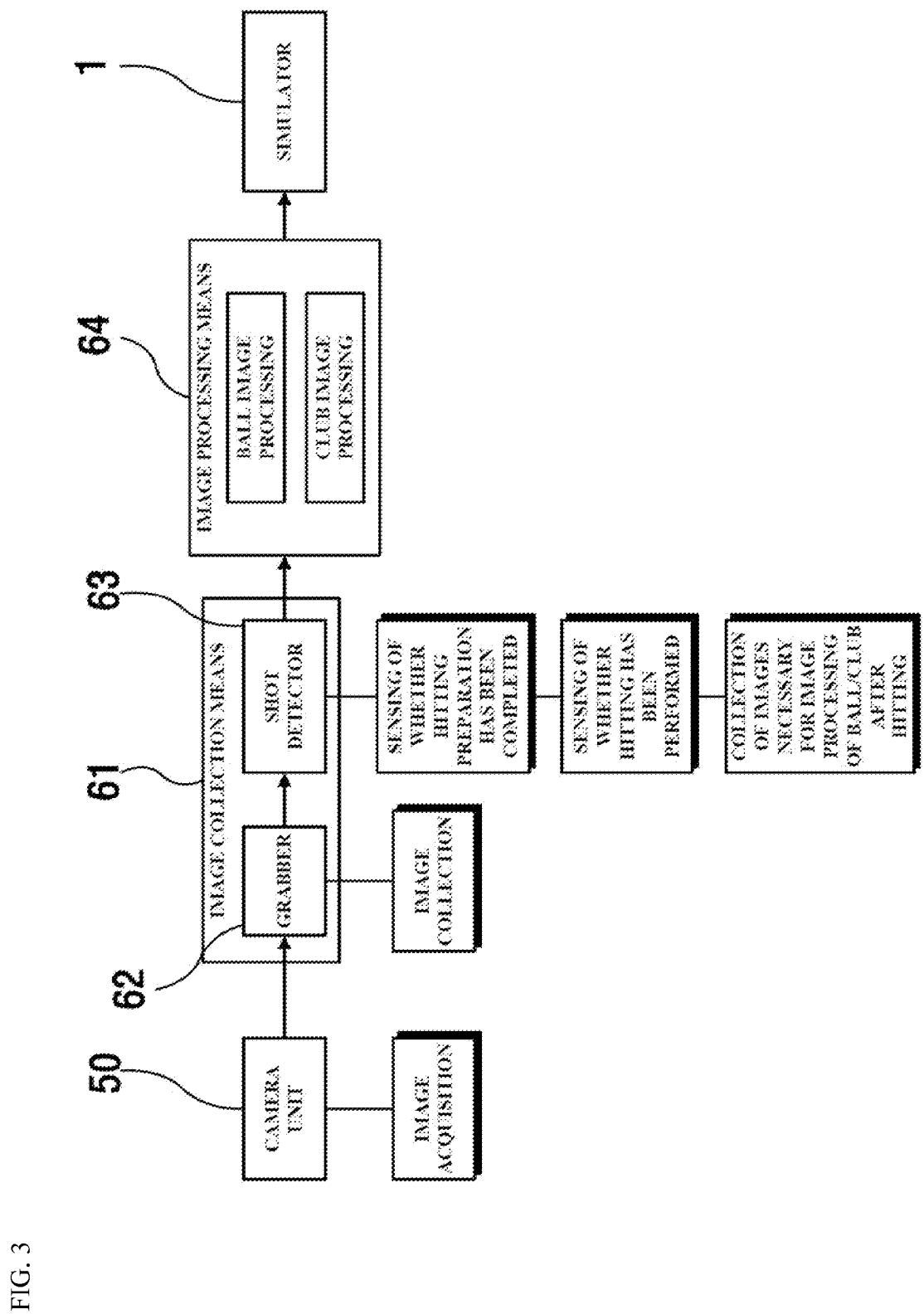
FIG. 3 is a view showing an information processing process of the virtual golf simulation apparatus according to the embodiment of the present invention.

As shown in FIG. 3, transmission of information in the sensing device according to the present invention is carried out in the order of the camera unit 50→the image collection means 61→the image processing means 64→the simulator 1.

The camera unit 50 captures a predetermined range including a portion at which the hitting box and the hitting mat are provided to acquire hundreds of frame images per second.

The acquired frame images are transmitted to the grabber 62 of the image collection means 61. The grabber 62 stores the images received from the camera unit 50 and, at the same time, transmits the images to the shot detector 63 so that image processing is carried out.

That is, the shot detector 63 processes the image received from the grabber 62 to sense whether hitting preparation has been completed and, upon sensing that the hitting preparation has been completed (that is, in a case in which a specific condition is satisfied, for example, predetermined time has elapsed in a state in which a golf ball is placed on the hitting mat), senses whether the user has hit the golf ball placed on the hitting mat using a golf club.

Upon sensing that the user has hit the golf ball, the shot detector 63 stores an image when the golf ball has been hit and a plurality of frame images thereafter. These images are transmitted to the image processing means 64 in real time so that the images can be processed by the image processing means 64.

The image processing means 64 processes the images received when the shot detector 63 senses the golf ball hit by the user to extract physical properties of the moving golf ball and transmits the extracted physical properties of the golf ball to the simulator 1.

At this time, the shot detector 63 and the image processing means 64 are configured to process the images in real time so that physical properties of the golf ball can be rapidly extracted, which will be described in detail with reference to FIG. 4.

Figure 4:
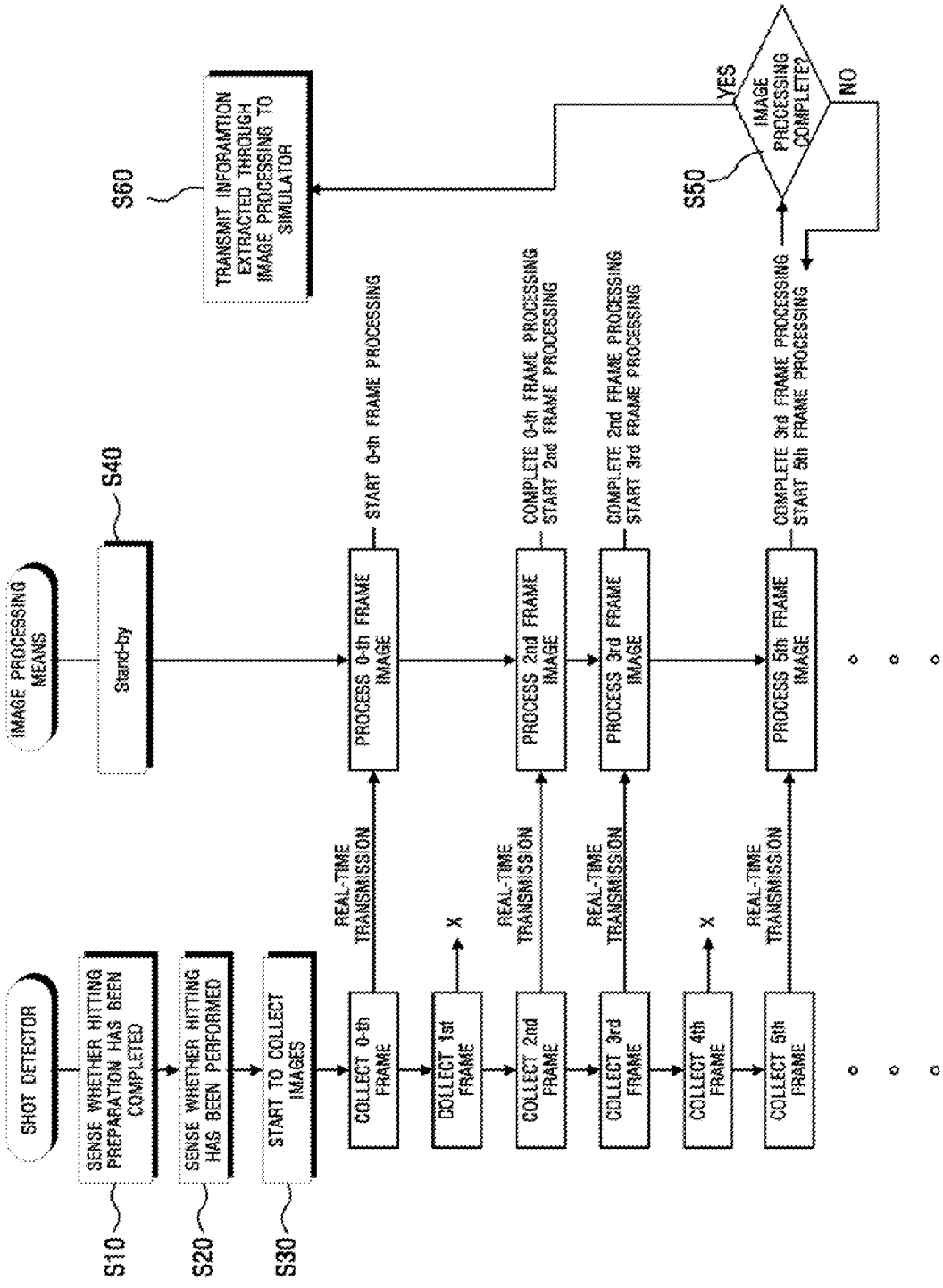
FIG. 4 is view showing a real-time image processing process of a sensing device according to an embodiment of the present invention.

As shown in FIG. 4, the shot detector senses whether hitting preparation has been completed (S10). When a user hits a golf ball and the shot detector senses the golf ball hit by the user (S20), the shot detector starts to collect images to be processed (S30).

In a case in which the camera unit acquires images at a velocity of, for example, 300 fps, approximately 300 frame images are acquired per second. The shot detector collects and stores 7 frame images before hitting, a frame image when the hitting is performed, and 30 frame images for 100 ms after hitting, and transmits the collected and stored frame images to the image processing means.

That is, the shot detector collects and stores images ranging from a 0-th frame image to a 30-th image. The respective frame images are transmitted to the image processing means in real time as soon as the respective frame images are collected.

It should be noted that the image processing means does not process all frame images collected by the shot detector but processes only images received in real time.

This is because it is not necessary to process all of the 30 frame images in order to extract physical properties of the moving golf ball but it is necessary to process a few frame images since substantially the same result as when analyzing the 30 frame images can be obtained even through a few frame images are analyzed.

In the sensing device according to the present invention, therefore, the image processing means processes only images which can be received in real time among images collected by the shot detector in order to reduce sensing processing time.

More specifically, upon collecting a 0-th frame image as shown in FIG. 4, the shot detector transmits the collected frame image to the image processing means. As soon as the frame image is transmitted to the image processing means, the image processing means, which is in a standby state (S40), starts to process the received image.

That is, the image processing means receives and processes the 0-th frame image and, when processing is completed, receives and processes a frame image, i.e. a second frame image, collected by the shot detector in real time.

While processing the 0-th frame image, the image processing means only stores a first frame image collected by the shot detector without transmission thereof.

If the image processing means rapidly process the second frame image immediately after processing the 0-th frame image as shown in FIG. 4 with the result that processing of the second frame image has been completed when the next frame image, i.e. a third frame image, is collected, the image processing means receives and processes the third frame image in real time.

That is, the shot detector is configured not to sequentially transmit images collected from the grabber to the image processing means in the collection order without omission but to transmit frame images collected when processing of the image previously transmitted to the image processing means has been completed in real time.

Also, the image processing means does not sequentially receive images from the shot detector but receives another frame image in real time when processing of the previously received image has been completed.

If the image processing means takes a lot of time to process the previously received image, therefore, several frame images may be skipped. On the other hand, if the image processing means processes the previously received image for a very short time, the frame image next to the previously received image can be immediately transmitted to the image processing means.

Meanwhile, the image processing means does not continuously perform image processing until the image processing means receives the final frame image but processes a predetermined number of frame images and determines whether image processing has been completed (S50). Upon determining that image processing has been completed, the image processing means ends image processing and transmits information on physical properties of the golf ball extracted through the image processing to the simulator (at this time, the shot detector continues to collect frame images until a predetermined number of frame images are collected and stored although the image processing means ends image processing). Upon determining that image processing has not been completed (in a case in which image processing has not been performed enough to extract information on physical properties of the golf ball), on the other hand, image processing is resumed from the next frame image received in real time.

If image processing has not been completed although the image processing means has performed image processing in real time (in a case in which image processing has not been performed enough to extract information on physical properties of the golf ball), the image processing means further receives and processes frame images, which have not been transmitted by the shot detector.

For example, as shown in FIG. 4, a first frame image and a fourth frame image have not been transmitted to the image processing means (at this time, the shot detector stores these frame images). The image processing means receives and processes frame images one by one from the first frame image and repeats such image processing until information on physical properties of the golf ball is extracted.

MODE FOR INVENTION

Various embodiments of the present invention have been described in the best mode.

INDUSTRIAL APPLICABILITY

The virtual golf simulation apparatus and method and a sensing device and method used for the same according to the present invention can be used in industries related to a golf game or so-called Screen Golf for a user to be able to play a virtual golf round by golf simulation based on a virtual reality.

The invention claimed is:

1. A sensing device used in a virtual golf simulation apparatus, comprising:
   at least one camera configured to acquire successive frame images of a ball hit by a user;
   a sensing processor comprising:
   a grabber configured to sequentially collect the successive frame images acquired by the at least one camera, the frame images comprising from a 1st frame image to an n-th frame image,
   a shot detector configured to receive the frame images transmitted from the grabber upon detection of the ball being shot, and to independently determine whether or when to transfer one of the frame images to an image processor, the shot detector further configured:
   in response to detection of completion of process of one of the frame images having been transferred to the image processor, the next frame image at the time of the completion of process being transferred from the shot detector to the image processor,
   in response to detection of one of the frame images, which having been transferred to the image processor, is not completely processed, none of frame images not being transmitted from the shot detector to the image processor until the process completion, wherein
   the image processor is configured to selectively receive one of the frame images which being independently transmitted from the shot detector upon completion of process and further to extract information on physical properties of a ball of the transferred frame image.

2. The sensing device according to claim 1, wherein sequential collection of the frame images by the shot detector and image processing by the image processor are independently operated.

3. A sensing device, comprising:
   at least one camera configured to acquire frame images of a ball hit by a user;
   a grabber configured to sequentially collect the frame images acquired by the at least one camera, the frame images comprising from a 1st frame image to an n-th frame image,
   a shot detector configured to receive the frame images transmitted from the grabber, and to independently determine whether or when to transmit one of the frame images to an image processor,
   in response to detection of completion of process of one of the frame images having been transferred to the image processor, the next frame image at the time of the completion of process being transferred from the shot detector to the image processor,
   in response to detection of one of frame image, which having been transferred to the image processor, is not completely processed, none of frame images not being transmitted from the shot detector to the image processor until the process completion, wherein
   the shot detector is configured to store frame images of the frame images, which not being transferred to the image sensor, wherein
   the image processor configured to selectively receive one of the frame images which being independently transmitted from the shot detector upon completion of process, and further to extract information on physical properties of a ball of the transferred frame image.

4. The sensing device according to claim 3, wherein, the image processor is further configured to receive and process some or all of the frame images which having not been transferred to the image processor to calculate physical properties of the ball, upon determination that the image processor fails to retrieve physical properties of the ball from the transferred frame image.

5. A computer-implemented sensing method for virtual golf simulation, comprising:
   receiving frame images of a ball hit by a user;
   sequentially collecting the frame images, the frame images comprising from a 1st frame image to an n-th frame image;

determining, by a processor, whether or when to transfer one of the frame images to an image processor for processing, in response to detection of completion of process of one of the frame images having been transferred to the image processor, transferring the next frame image at the time of the completion of process from the shot detector to the image processor, in response to detection of one of the frame images, which having been transferred to the image processor, is not completely processed, none of frame images not being transmitted from the shot detector to the image processor until the process completion, selectively receiving one of the frame images which being independently transmitted from the shot detector upon completion of process; and extracting information on physical properties of a ball of the transferred frame image.

6. The sensing method according to claim 5, further comprising:

independently collecting and storing the frame images during the completion of process of the transferred frame image of the frame images.

\* \* \* \* \*